UNITED STATES PATENT OFFICE.

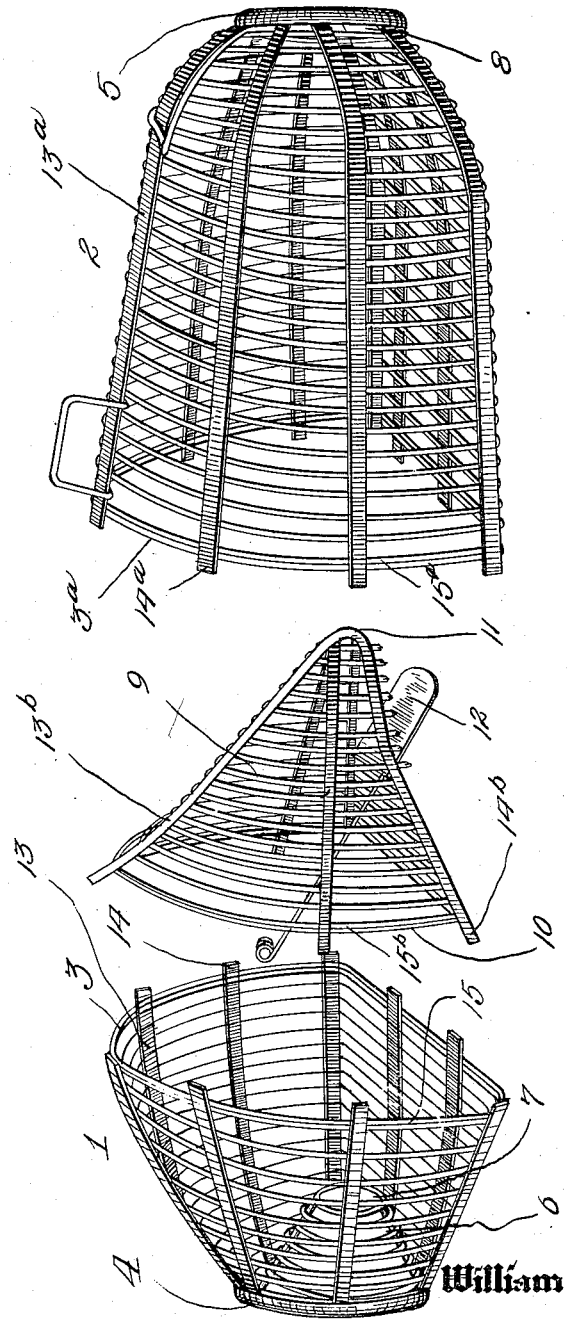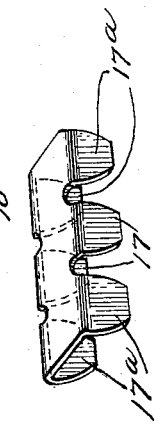

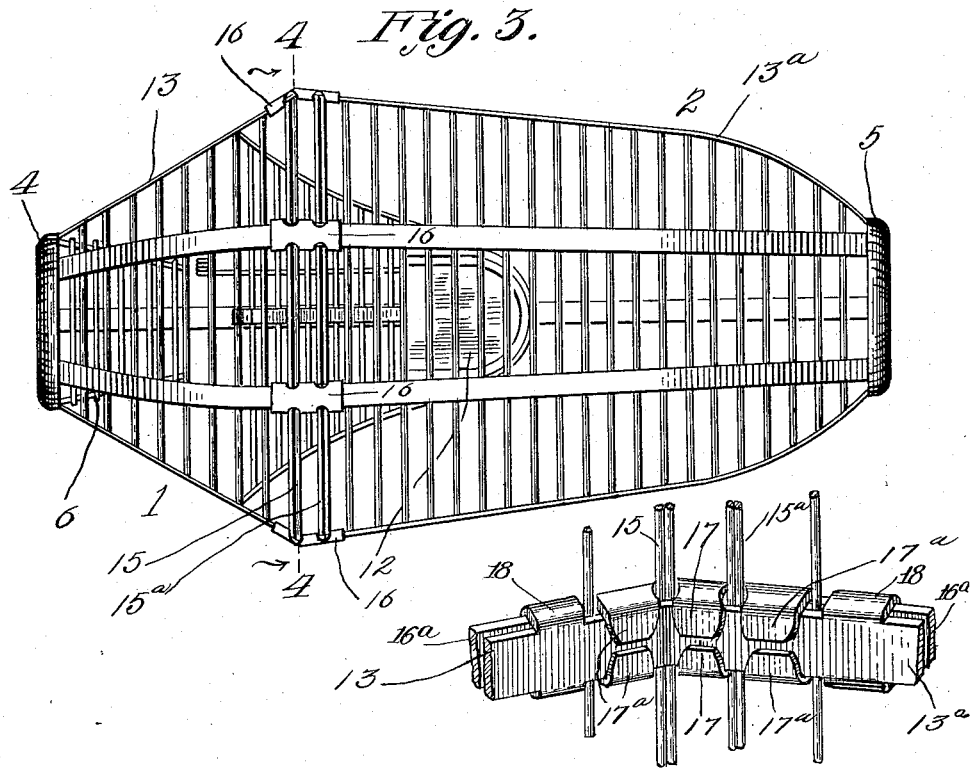
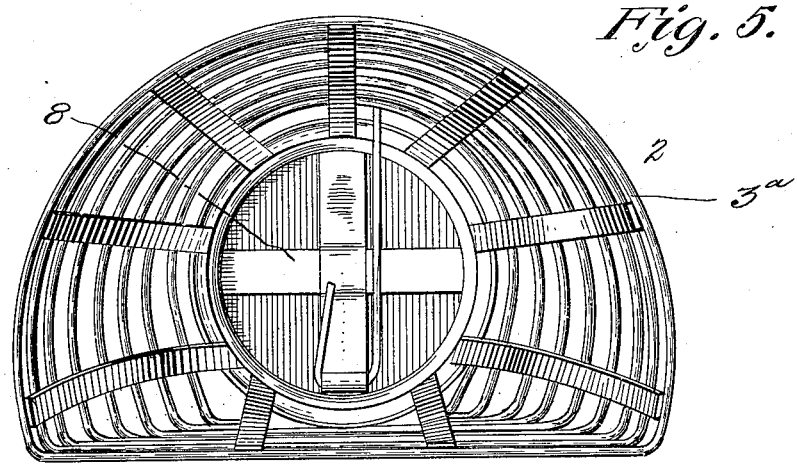

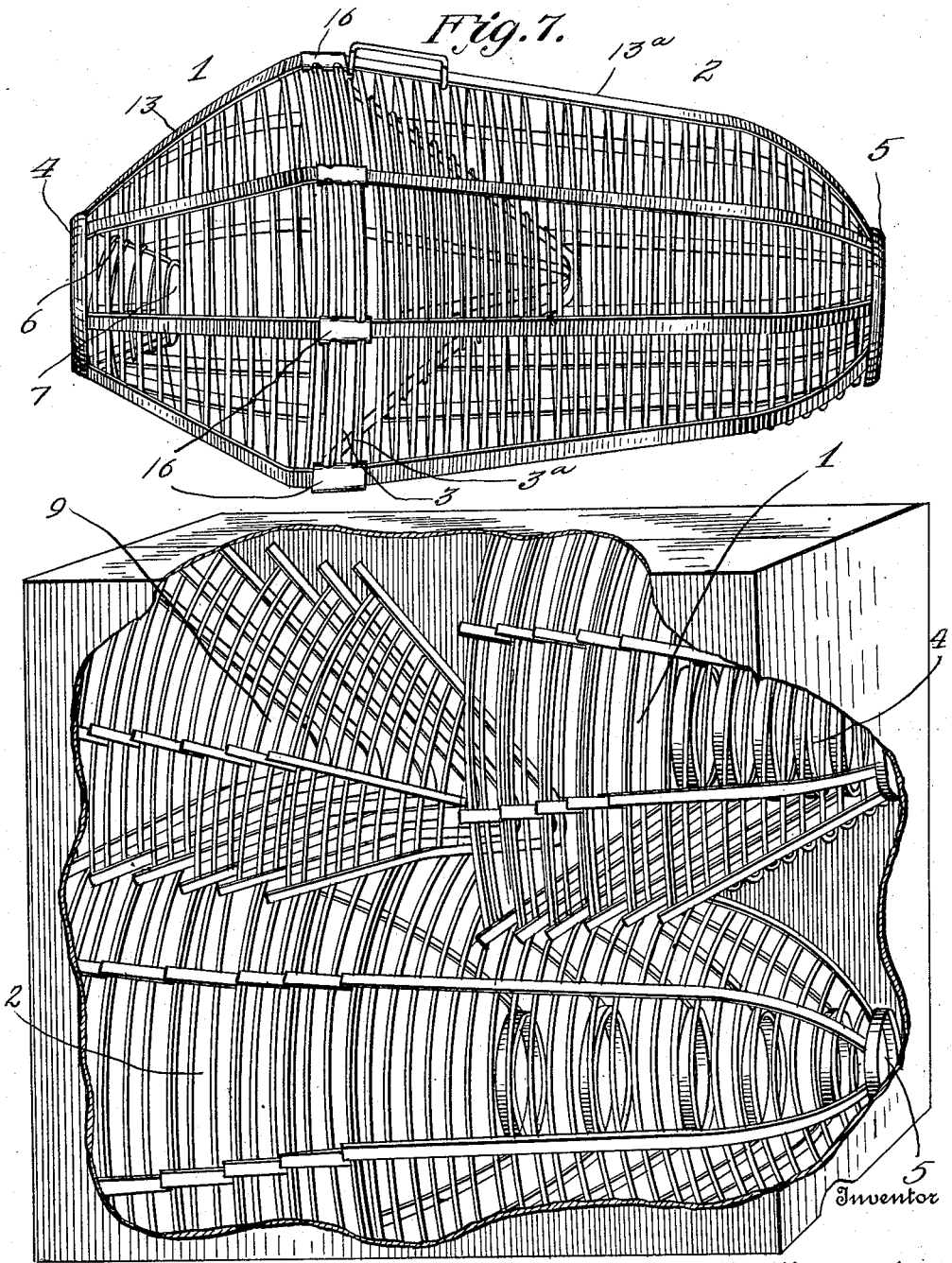

WILLIAM W. WORCESTER, OF CANTON, OHIO.

RAT-TRAP.

1,173,629.  Specification of Letters Patent.  Patented Feb. 29, 1916.

Application filed September 5, 1912. Serial No. 718,617.

*To all whom it may concern:*

Be it known that I, WILLIAM W. WORCESTER, a citizen of the United States, residing at Canton, in the county of Stark and State of Ohio, have invented certain new and useful Improvements in Rat-Traps, of which the following is a specification.

The invention relates to traps for animals of the general character, set forth in Letters Patent No. 908,827 and No. 940,911, heretofore issued to me; and the general object of the improvement is to construct such a trap in three separate sections, each of which can be nested with like sections for packing and shipping, and all of which can be readily joined by the merchant or user, to form a complete trap. Traps of this character are frequently made by assembling longitudinal metal strips and circumferential wires upon a form, and then securing the strips and wires together at the several intersections; and a further object of the present invention is to permit the making of the trap-cage in two sections, each one of which can be separately made upon and readily removed from a suitable form.

The invention also pertains to the shape of the trap-cage, and involves the making of the same with a flattened lozenge-like bottom for rendering it more difficult to be turned over by a rat either inside or outside of the trap.

A preferred embodiment of the invention, thus set forth in general terms, is illustrated in the accompanying drawings, forming part hereof, in which, Figure 1 is a perspective view of the three separate sections of which the trap is made, located in relative position for assembling. Fig. 2, a detached perspective view of one of the joint-clips bent for use. Fig. 3, a bottom plan view of the completed trap; Fig. 4, an end view of the cell section on line 4—4, Fig. 3; Fig. 5, a fragmentary view showing method of making clip joint. Fig. 6, a detached perspective view of a box, broken away, and showing a number of each trap sections nested together and packed therein; and Fig. 7, a perspective view of the complete trap showing the three sections thereof assembled and secured together.

Similar numerals refer to similar parts throughout the drawings.

For the purposes of the present invention, the trap cage is made of two end sections, 1 and 2, the former of which constitutes the wall of the receiving chamber when the parts are assembled and may therefore be called the receiving section, and the latter of which forms the cell chamber when the parts are assembled and may therefore be called the cell section of the cage. Each of the cage sections is preferably flattened on the lower side, so as to give the bottom of the completed trap a lozenge-like shape as shown in Fig. 3.

The rim 3, of the receiving section, and the rim 3ª of the cell section, are made of corresponding size and shape, so that they may be joined together for completing the trap cage; and each section is tapered by inclined or curved lines, as may be desired, from a larger diameter at the joint rims 3 and 3ª, to a smaller diameter at the end rims 4 and 5, the end rim 4 of the receiving section forming the receiving opening, and the end rim 5 of the cell section forming the exit opening of the cage.

The conical vestibule 6 is located within the receiving section of the trap cage with its outer end joined to the rim 4 of the receiving section, and its inner smaller end, truncated to form the inlet opening 7 of the trap. And the exit opening formed by the rim 5, of the cage, is normally closed by a suitable door 8, which is secured and opened and closed in the usual manner, as for instance by the means shown and described in my said Letters Patent No. 940,911.

The partition section 9 of the trap is conical in general shape, and its base or joint rim 10, is preferably made of such size and shape that it will telescope within the rim of either one of the end sections, as for instance, the receiving section of the trap cage. The apex 11 of the partition-section points toward the exit end of the trap and the counterbalanced trap door 12 is pivoted in the flattened bottom of the partition in the usual manner.

The complete trap is made by joining the corresponding rim portions of the several sections together, which joinder is preferably made by extending the longitudinal strips 13, 13ª and 13ᵇ of the several sections beyond the joint-rims 3, 3ª and 10 thereof, thus forming the connecting tongues 14, 14ª and 14ᵇ; and for strengthening the joints, the circumferential wires 15, 15ª and 15ᵇ are preferably doubled at the rims 3 3ª and 10 of the several sections.

The preferred method of assembling and connecting the sections, is to place the rim of the partition section just within the rim of the receiving section, and then bend the tongues 14ᵇ of the partition-section around at least one of the circumferential wires 15, of the receiving section. For convenience in assembling the parts, the tongues of the partition section are preferably bent around one of the circumferential wires of the receiving section adjacent to the rim thereof between the longitudinal strips 13, although it is evident that these tongues may just as well be secured to one or more of the circumferential wires forming the joint rim thereof.

By the preferred method of connecting the trap sections together, the protruding tongues 14 and 14ᵃ of the cage-sections 1 and 2, are arranged to coincide with and overlap each other, and when placed in such relation, the sections are connected together, by means of their joint clips 16, having the sides notched to form the series of tongues 17 and 17ᵃ on each side; it being understood that when assembled, sufficient space is left between the rim wires of the cage sections for the intermediate tongues 17 which are arranged to be bent and entered between the joint rims and clamped around the lapped joint tongues 14 and 14ᵃ of the cage sections, and the end tongues 17ᵃ are arranged to be bent and clamped around the strips between the rim wires and the next adjacent circumferential wires of the cage-sections. The longitudinal strips 13 and 13ᵃ may also be provided with the lateral tongues 18, adapted to be clamped around the side edges of the joint-clip 16ᵃ, which is extended lengthwise for that purpose, as shown in Fig. 5.

By the peculiar construction and arrangement of the several parts of the trap, it is evident that each separate section can be readily made upon a tapered form; that when so made, the several sections can be nested one within the other, as for packing, for storing, or transporting, as shown in Fig. 6; and finally, that the retail merchant or the user can readily assemble and secure together, the several sections to form the complete trap as shown in Figs. 3 and 7.

It is evident that the lozenge-like shape of the flattened bottom of the completed trap, caused by the tapering of the cage sections from the wider joint dimension each way to the relatively narrow ends, renders it more difficult for a rat to overturn the trap, because an effort to lift either side of the trap at either end portion, tends to swing the trap around on the pivot formed by the opposite angle of the wide rim-joint portion of the bottom.

I claim:

1. A rat trap composed of two tapered cage-sections and a conical partition-section having the corresponding rim portions of their larger ends joined together.

2. A rat trap composed of two tapered cage-sections and a conical partition-section, the several sections having tongues on their larger end rims joining them together.

3. A rat trap composed of two tapered cage-sections and a conical partition-section having the corresponding rim portions of their larger ends joined together, one of the cage-sections having a conical vestibule therein.

4. A rat trap composed of two tapered cage-sections and a conical partition-section, there being tongues on the rim of the partition-section engaging the rim portion of one cage-section, and there being coinciding tongues on the rims of the cage-sections joined together.

5. A rat trap composed of two tapered cage-sections and a conical partition-section, there being tongues on the rim of the partition-section engaging the rim portion of one cage-section, and there being coinciding tongues on the cage-sections, with means for securing the coinciding tongues together.

6. A rat trap including two cage-sections each made of longitudinal strips and circumferential wires, the strips being extended at the rims and clips having lateral tongues clamped around the extended strips and also having lateral tongues clamped around the strips between the rims and the adjacent wires.

7. A rat trap including two cage-sections, each made of longitudinal strips and circumferential wires, the strips being extended at the rims, and clips having lateral tongues clamped around the extended strips.

8. A rat trap including two cage-sections, made of longitudinal strips and circumferential wires, the strips being extended at the rims, with means for securing the extended strips together.

9. A rat trap including two cage-sections each made of longitudinal strips and circumferential wires, the strips being extended at the rims and joined together.

WILLIAM W. WORCESTER.

Witnesses:
PHILIP A. H. TERRELL,
HURXTHAL F. FREASE.